P. W. STEIN.
NUT LOCKING DEVICE.
APPLICATION FILED NOV. 24, 1911.
1,024,291.
Patented Apr. 23, 1912.
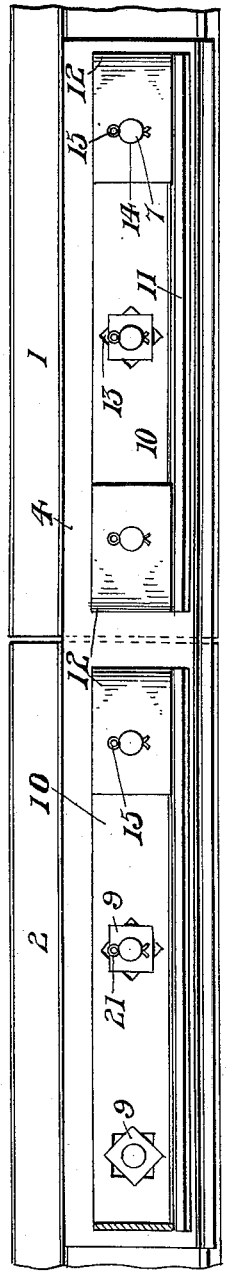
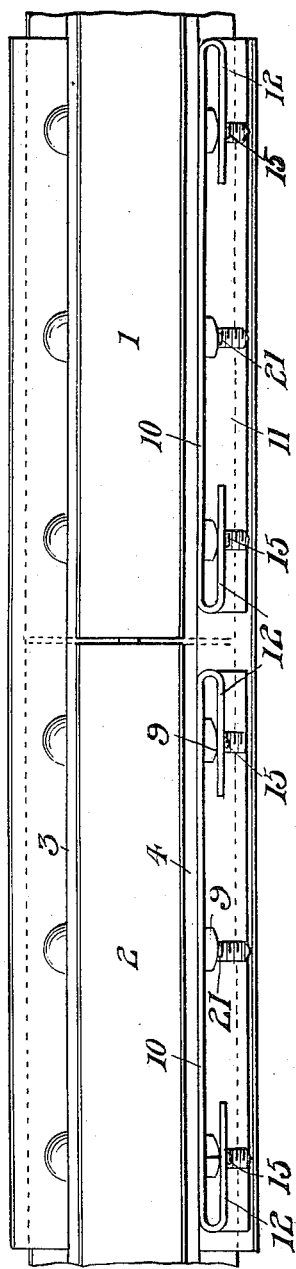
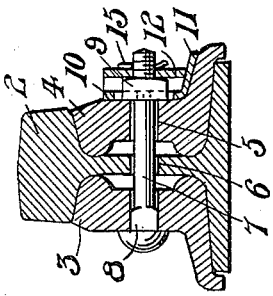
WITNESSES
INVENTOR
Peter W. Stein
BY
ATTORNEYS

UNITED STATES PATENT OFFICE.

PETER W. STEIN, OF HOMESTEAD, PENNSYLVANIA.

NUT-LOCKING DEVICE.

1,024,291.

Specification of Letters Patent. Patented Apr. 23, 1912.

Application filed November 24, 1911. Serial No. 662,150.

*To all whom it may concern:*

Be it known that I, PETER W. STEIN, a citizen of the United States of America, residing at Homestead, in the county of Allegheny and State of Pennsylvania, have invented certain new and useful Improvements in Nut-Locking Devices, of which the following is a specification, reference being had therein to the accompanying drawing.

This invention relates to a nut locking device especially designed for rail joints, bridges, rolling stock and structures having parts connected by a plurality of bolts and nuts.

The primary object of my invention is to provide a simple and inexpensive device that can be easily and quickly installed for positively locking nuts relatively to bolts or with respect to each other, whereby the nuts cannot become accidentally displaced due to vibrations.

Another object of this invention is to accomplish the above results by a mechanical construction that is simple and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a side elevation of the nut locking device as applied to a rail joint, Fig. 2 is a plan of the same, Fig. 3 is a cross sectional view of the rail joint.

The reference numerals 1 and 2 denote, by the way of an example, rails braced by splice bars 3 and 4, said bars having openings 5 alining with openings 6 in the webs of the rails 1 and 2 to receive bolts 7, said bolts having the headed ends 8 thereof anchored in the splice bar 3. The threaded ends of the bolts are provided with nuts 9 that are screwed against the splice bar 4.

The reference numerals 10 denote locking bars having base flanges 11 and malleable ends 12. The locking bars 10 are provided with openings having the walls thereof formed with angle recesses 13, said openings having a star or eight pointed configuration. These openings provide clearance for the nuts 9 and the recesses 13 of said openings receive the angle faces of the nuts, said openings receiving the nuts in eight different positions of adjustment. After the locking bar has been fitted upon the nuts, the malleable ends 12 thereof are bent on to the ends of the endmost bolt 7 of each rail, the malleable ends 12 having openings 14 to receive the ends of the bolts 7, and the ends of the bolts opening to receive cotter pins 15 employed for locking the malleable ends 12 in engagement with said bolts, whereby the locking bars cannot become accidentally displaced.

The locking bars can be made of various lengths to accommodate a plurality of nuts and of various kinds of light and durable material.

What I claim is:—

In a nut locking device, the combination with bolts provided with nuts, of a locking bar arranged upon said nuts and having openings with the walls thereof provided with angle recesses to receive the angle faces of said nuts, said bar having the ends thereof bent and apertured to receive the ends of some of said bolts, and cotter pins extending through said bolts for retaining the malleable ends of said bar in engagement therewith.

In testimony whereof I affix my signature in the presence of two witnesses.

PETER W. STEIN.

Witnesses:
PETER S. BOST,
C. T. HOOD.

Copies of this patent may be obtained for five cents each, by addressing the "Commissioner of Patents, Washington, D. C."